US007930392B2

(12) United States Patent
Saadeh et al.

(10) Patent No.: US 7,930,392 B2
(45) Date of Patent: Apr. 19, 2011

(54) METHOD AND SYSTEM FOR PROVIDING A SELF-POPULATING DATABASE FOR THE NETWORK COLLECTION OF METER DATA

(75) Inventors: Theresa M. Saadeh, Milwaukee, WI (US); Michele R. B. Malinowski, Hartford, WI (US)

(73) Assignee: Badger Meter, Inc., Milwaukee, WI (US)

( * ) Notice: Subject to any disclaimer, the term of this patent is extended or adjusted under 35 U.S.C. 154(b) by 157 days.

(21) Appl. No.: 12/186,895

(22) Filed: Aug. 6, 2008

(65) Prior Publication Data

US 2009/0216878 A1     Aug. 27, 2009

Related U.S. Application Data

(63) Continuation of application No. PCT/US2008/002426, filed on Feb. 25, 2008.

(51) Int. Cl.
*G06F 15/173* (2006.01)
*G06F 15/16* (2006.01)
(52) U.S. Cl. .................... 709/224; 709/217
(58) Field of Classification Search .......... 709/224, 709/217; 340/870.02
See application file for complete search history.

(56) References Cited

U.S. PATENT DOCUMENTS

| | | | |
|---|---|---|---|
| 4,817,131 A * | 3/1989 | Thornborough et al. | 379/106.04 |
| 4,831,582 A | 5/1989 | Miller et al. | |
| 4,940,976 A * | 7/1990 | Gastouniotis et al. | 340/870.02 |
| 5,553,094 A * | 9/1996 | Johnson et al. | 375/130 |
| 5,751,797 A | 5/1998 | Saadeh | |
| 5,914,673 A * | 6/1999 | Jennings et al. | 340/870.02 |
| 6,088,659 A * | 7/2000 | Kelley et al. | 340/870.02 |
| 6,163,602 A * | 12/2000 | Hammond et al. | 379/114.01 |
| 6,226,788 B1 * | 5/2001 | Schoening et al. | 717/107 |
| 6,363,057 B1 | 3/2002 | Ardalan et al. | |
| 6,396,839 B1 | 5/2002 | Ardalan et al. | |
| 6,553,418 B1 * | 4/2003 | Collins et al. | 709/224 |
| 6,747,981 B2 | 6/2004 | Ardalan et al. | |
| 6,867,707 B1 | 3/2005 | Kelley et al. | |
| 6,891,838 B1 | 5/2005 | Petite et al. | |
| 6,900,737 B1 | 5/2005 | Ardalan et al. | |
| 6,931,445 B2 | 8/2005 | Davis | |
| 6,965,319 B1 * | 11/2005 | Crichlow | 340/870.02 |
| 7,046,682 B2 | 5/2006 | Carpenter et al. | |
| 7,126,494 B2 | 10/2006 | Ardalan et al. | |
| 7,505,453 B2 | 3/2009 | Carpenter et al. | |

(Continued)

OTHER PUBLICATIONS

PCT/US2008/002426 International Search Report.*

(Continued)

*Primary Examiner* — Shawki S Ismail
*Assistant Examiner* — Robert Shaw
(74) *Attorney, Agent, or Firm* — Boyle Fredrickson, S.C.

(57) ABSTRACT

The invention provides a method and a system for collection of meter readings from the field and for providing a self-populating database for storing and retrieving the meter data. A network data collection computer operating according to a stored computer program reads in data from the receivers and detects the meter reading devices that are sending data through a respective receiver. If not previously detected, the network data collection computer allocates space in the database for the data and stores the meter data and indexes it by the receiver and meter reading device from which it was received, and by the date and time of reception at the network data collection system. This data can then be retrieved and displayed or printed out by these parameters in database reports.

16 Claims, 6 Drawing Sheets

U.S. PATENT DOCUMENTS

| | | | |
|---|---|---|---|
| 2002/0091672 A1* | 7/2002 | Vos et al. | 707/1 |
| 2003/0063723 A1* | 4/2003 | Booth et al. | 379/106.03 |
| 2004/0059585 A1* | 3/2004 | Villicana et al. | 705/1 |
| 2004/0218616 A1* | 11/2004 | Ardalan et al. | 370/401 |
| 2005/0278428 A1* | 12/2005 | Motoyama et al. | 709/206 |
| 2006/0022841 A1* | 2/2006 | Hoiness et al. | 340/870.02 |
| 2007/0013547 A1* | 1/2007 | Boaz | 340/870.02 |
| 2007/0018850 A1 | 1/2007 | Flen et al. | |
| 2007/0063866 A1* | 3/2007 | Webb | 340/870.02 |
| 2007/0236362 A1* | 10/2007 | Brian et al. | 340/870.02 |
| 2008/0001778 A1 | 1/2008 | Challener et al. | |
| 2008/0129825 A1 | 6/2008 | DeAngelis et al. | |
| 2009/0119233 A1* | 5/2009 | Dunagan et al. | 705/412 |

OTHER PUBLICATIONS

IEEE Dictionary, p. 2010—defintition "self-organizing".*
American Heritage Dictionary—definition "organize" http://www.credoreference.com/entry/hmdictenglang/organize.*
Merriam-Webster Dictionary—defintion "organize".*
Deakin, R., "A Database Primer", New American Library, New York, NY, 1984, pp. 43-52.

* cited by examiner

| | | Day | | | | | | | | | | | | | Average | |
|---|---|---|---|---|---|---|---|---|---|---|---|---|---|---|---|---|
| | | 1 | % | 2 | % | 3 | % | 4 | % | 5 | % | 6 | % | 7 | % | # | % |
| Gateway # | 1 | 73 | 29.0 | 71 | 28.2 | 74 | 29.4 | 76 | 30.2 | 78 | 31.0 | 72 | 28.6 | 70 | 27.8 | 73 | 29.0 |
| | 2 | 75 | 29.8 | 74 | 29.4 | 75 | 29.8 | 73 | 29.0 | 72 | 28.6 | 76 | 30.2 | 74 | 29.4 | 74 | 29.4 |
| | 3 | 76 | 30.2 | 70 | 27.8 | 69 | 27.4 | 72 | 28.6 | 74 | 29.4 | 71 | 28.2 | 75 | 29.8 | 72 | 28.6 |
| | 4 | 55 | 21.8 | 54 | 21.4 | 49 | 19.4 | 52 | 20.6 | 53 | 21.0 | 51 | 20.2 | 52 | 20.6 | 52 | 20.6 |
| Average | | 279 | 111 | 269 | 107 | 267 | 106 | 273 | 108 | 277 | 110 | 270 | 107 | 271 | 108 | 272 | 108 |

METHOD AND SYSTEM FOR PROVIDING A SELF-POPULATING DATABASE FOR THE NETWORK COLLECTION OF METER DATA

CROSS REFERENCE TO RELATED APPLICATION

This is a continuation of PCT/US08/02426, filed on Feb. 25, 2008.

TECHNICAL FIELD

This invention relates to automatic meter reading (AMR) systems and, in particular, to utility meters using a radio transmitter for transmitting meter data signals to a radio receiver in a fixed network for collecting utility meter data over a geographical area, such as a municipality.

DESCRIPTION OF THE BACKGROUND ART

Fixed network AMR (automatic meter reading) systems typically involve meters equipped with radio transmitters operating in a local area network with radio receivers, also sometimes operating as gateways, for collecting meter data from the transmitters and then transmitting the meter data through a second network to a central office. The meter data is transmitted from the receivers or gateways to the central office for processing into customer statements of account. Typically, there is at least a network communications computer and a billing computer at the central office, although various systems at the collection end are possible.

In the prior art, installing an AMR system included the setting up of the central office data collection system and a database for the meter data, and this was a time consuming task involving the manual listing of all transmitters in the field and associating them with their respective receivers at the central office. A general object of the invention is to provide for easier installation and set up of an AMR system, thereby saving labor and installation cost and providing ease of use to the utility.

SUMMARY OF THE INVENTION

The invention provides a method and a system for collection of meter readings from meter reading and transmitting devices for providing a self-populating database for storing and retrieving the meter data.

The method provides for collection of meter data through a wide area network from at least one receiver communicating in a local network with a plurality of meter reading devices in a geographic area. As used herein, the term "meter data" should be understood to include either utility consumption data or certain condition status data, or both.

The method comprises addressing at least one receiver through a wide area network at a receiver network address, and receiving a data file through the wide area network from the receiver that includes meter data from a plurality of meter reading devices that have previously communicated with the receiver.

The method further comprises reading an identifier for each of the meter reading devices from the data file and organizing the identifier in a database in association with the receiver network address and meter data for each respective meter reading device.

The method further comprises storing meter data from each of the meter reading devices in the database for retrieval by at least one of: a receiver network address, the meter reading device identifier and a time and date of collection.

The method of the present invention provides a database that is thus self-populating. The method requires only a list of addresses for the receivers and a reading interval to begin operation. This saves much labor in installing the network data collection portion of AMR system. In reading files from the receivers, the network data collector obtains a list of the meter reading devices associated with each receiver and stores that list in memory in association with the receiver address and the meter data from those meter reading devices.

The method of the invention further includes reading a file of meter data in the form of an HTML web page, then decoding the HTML data that it receives from the receiver, and storing it in memory in a database organization of data.

The method of the invention includes reading data from the receivers at scheduled intervals, such as an hour, four times per day or daily, and the file of metering data further includes the read schedule interval for each receiver. Data can be retrieved from the database based on the date and time it was read from the receiver.

The method and system of the present invention can run on a network data collection computer running under a Windows® operating system with network access to a wide area network, such as the Internet.

The invention further relates to a meter data collector program for operating on a network meter data collection computer, the meter data collector program comprising a network reader portion for addressing at least one receiver through a wide area network at a receiver network address, wherein the network reader portion receives a data file through the wide area network from the at least one receiver that includes meter data from a plurality of meter reading devices that have previously communicated with the receiver. The meter data collector program further comprises a database organization portion for detecting an identifier for each of the meter reading devices from the data file and for organizing the identifier for each meter reading device in a database in association with the receiver network address and the meter data for the respective meter reading device; and a database reports portion for retrieving meter data from each of the meter reading devices according to at least one of: a receiver address, a meter reading device identifier and a time and date of collection.

The network meter data collection computer can be accessed by billing computers to access meter data from the database for billing purposes. The data collection computer can also be accessed by system monitoring computers to access meter data from the database for monitoring the condition data throughout the system.

Other objects and advantages of the invention, besides those discussed above, will be apparent to those of ordinary skill in the art from the description of the preferred embodiments which follows. In the description, reference is made to the accompanying drawings, which form a part hereof, and which illustrate examples of the invention.

BRIEF DESCRIPTION OF THE DRAWINGS

FIG. 5b is a detail data map of a header in the field of data in FIG. 5a; and

FIG. 5c is a detail data map of a line of data in the body of the file shown in FIG. 5a.

DETAILED DESCRIPTION OF THE PREFERRED EMBODIMENTS

Figure 1:
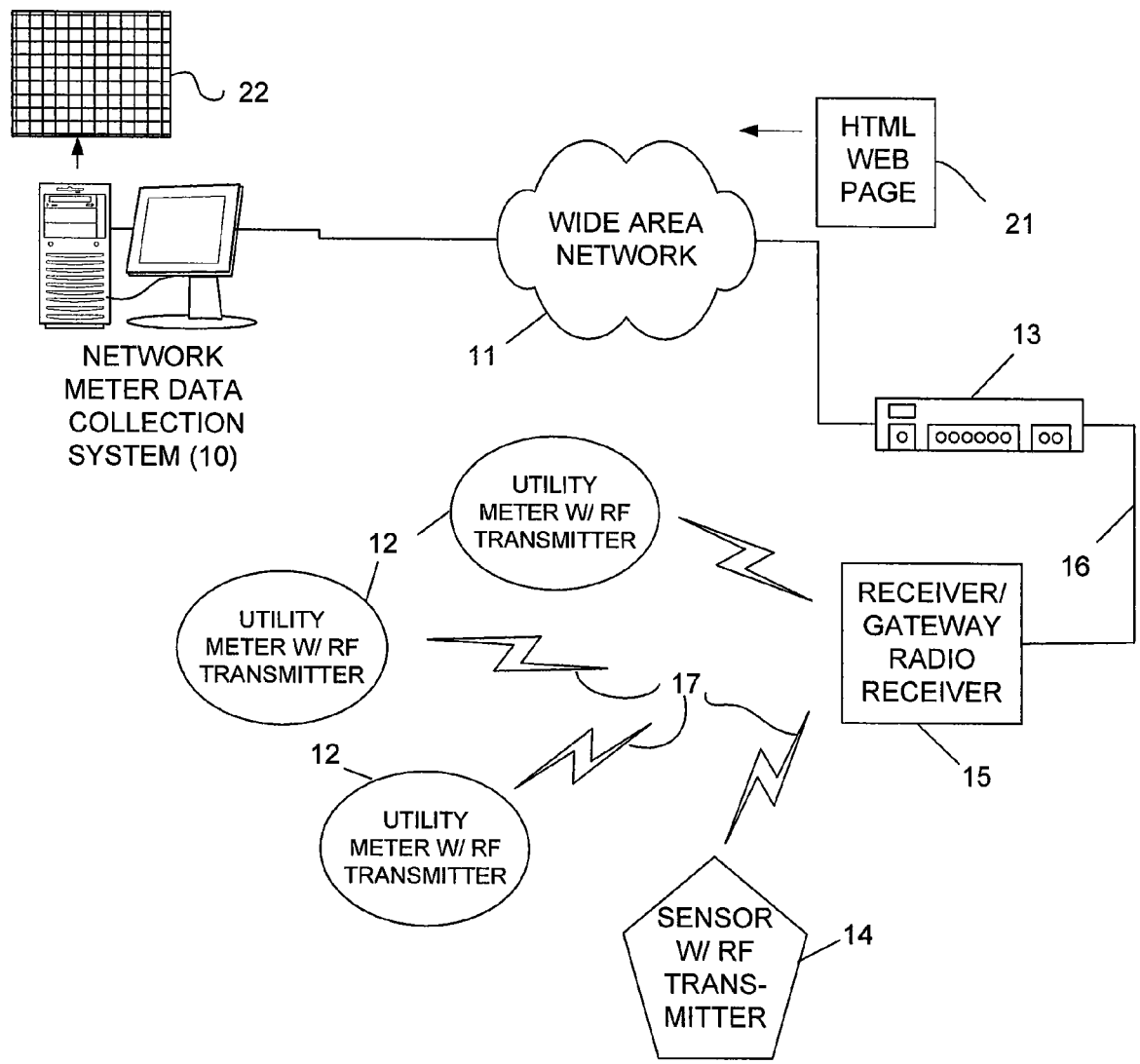
FIG. 1 is a schematic of a fixed network AMR system for collecting meter data from transmissions from meter data reading devices and organizing the meter data in a database according to the present invention.

Referring to FIG. 1, a network data collection computer 10 is provided in an office for collecting metering data from a fixed network of meter reading devices 12 distributed within a geographic area served by a utility. The network data collection computer 10 typically is connected to a billing computer (not shown) which requests data and imports a data file from the network server 10 to obtain meter data to produce customer statements of account for utility usage. The network data collection computer 10 can also be accessed by a system monitoring computer for monitoring exception conditions such as leakage or tampering or shut-off conditions. It is also possible that, in some embodiments, the functions of these separate computers could be combined in a single computer running multiple application programs. In this preferred embodiment, the utility is water, however, in other embodiments the utility can be gas or electricity.

The network data collection computer 10 communicates over a wide area network (WAN) 11, such as the Internet, to a router 13. A plurality of network of meter reading devices 12 each include a utility meter, a transducer and an RF (radio frequency) transmitter. In this example, the units 12 can be meter reading and transmitting units commercially offered under the Orion® trademark or the Galaxy® trademark by the assignee of the present invention. These meter reading devices 12 transmit radio frequency (RF) signals 17 to a receiver 15 to form a local area wireless network. It should be understood that there are typically more than one receiver 15 in a network, although only one is illustrated in FIG. 1. Sometimes the receiver 15 is also referred to as a "gateway" because it interfaces between the local area wireless network and another longer range network 11. Alternatively, the meter reading devices 14 may be sensors for sensing other types of conditions at the utility meter or in supply links connected to the utility meters. These sensors may be connected to Orion® or Galaxy® radio transmitters to transmit status data to the receiver 15.

The meter reading devices 12, 14 transmit data-encoded RF signals over low power RF frequencies either in the non FCC-licensed ISM (Industrial-Scientific-Medical) band from 902 MHz to 928 MHz. (Orion® AMR systems) or in the FCC-licensed frequencies such as 150-200 Mhz, 325 MHz, 433.92 MHz or from 450 to 470 MHz (Galaxy® AMR systems). The meter data transmitters 12, 14 transmit to an RF receiver 15, which in this case is an Orion® receiver that is connected via a wired Ethernet local network 16 to a WAN (Internet) router 19. In other embodiments, a wireless connection between the receiver and the router can be used. The router 19 is connected to a wide area network 11, in this embodiment to the Internet. In another embodiment, the receiver 15 is a gateway receiver of the type offered under the Galaxy® trademark. The network data collection computer 10 is also connected to the wide area network 11, the Internet, and can address the receivers 15 at a receiver network address which can be an Internet Protocol (IP) address of the format WWW.XXX.Y.ZZZ—where W,X, Y and Z are values in a range from "0" to "255", such as for example: 192.168.1.175. The receiver network address can also be a uniform resource locator (URL) in the form: http://www.google.com.

The invention provides a method and a system for the collection of meter data from the meter reading devices 12, 14 and for providing a self-populating database 22 in the data collection computer 10 for storing and the meter data for retrieval according to certain parameters. As used herein, the term "meter data" should be understood to include either utility consumption data or condition status data, or both. Condition status data includes leak detection data, tamper data and shut-off valve data and other types of data concerning meter operation besides actual utility consumption data.

The method and system of the present invention runs on the network data collection computer 10 running under a Windows® operating system with network access to the Internet 11. The method of the invention communicates with the receiver 15 using a receiver network address that has been preset in the receiver 15 and provided to the network data collection computer 10 on a first reading. The method of the invention further includes reading a file of meter data illustrated in FIG. 5, which is communicated within an HTML web page 21, then decoded from the HTML data and stored in memory in a database 22 of data.

The database 22 stores a receiver network address, a list of transmitting devices 12, 14 served by the receiver 15, a history of readings for the transmitting devices 12, 14 and a history of readings from the receiver 15 as shall be described in more detail below in relation to FIGS. 5a-5c.

As a preliminary step, when the receivers 15 are installed in the field, they are provided with a receiver network address for communication with the network data collection computer 10.

Figure 2:
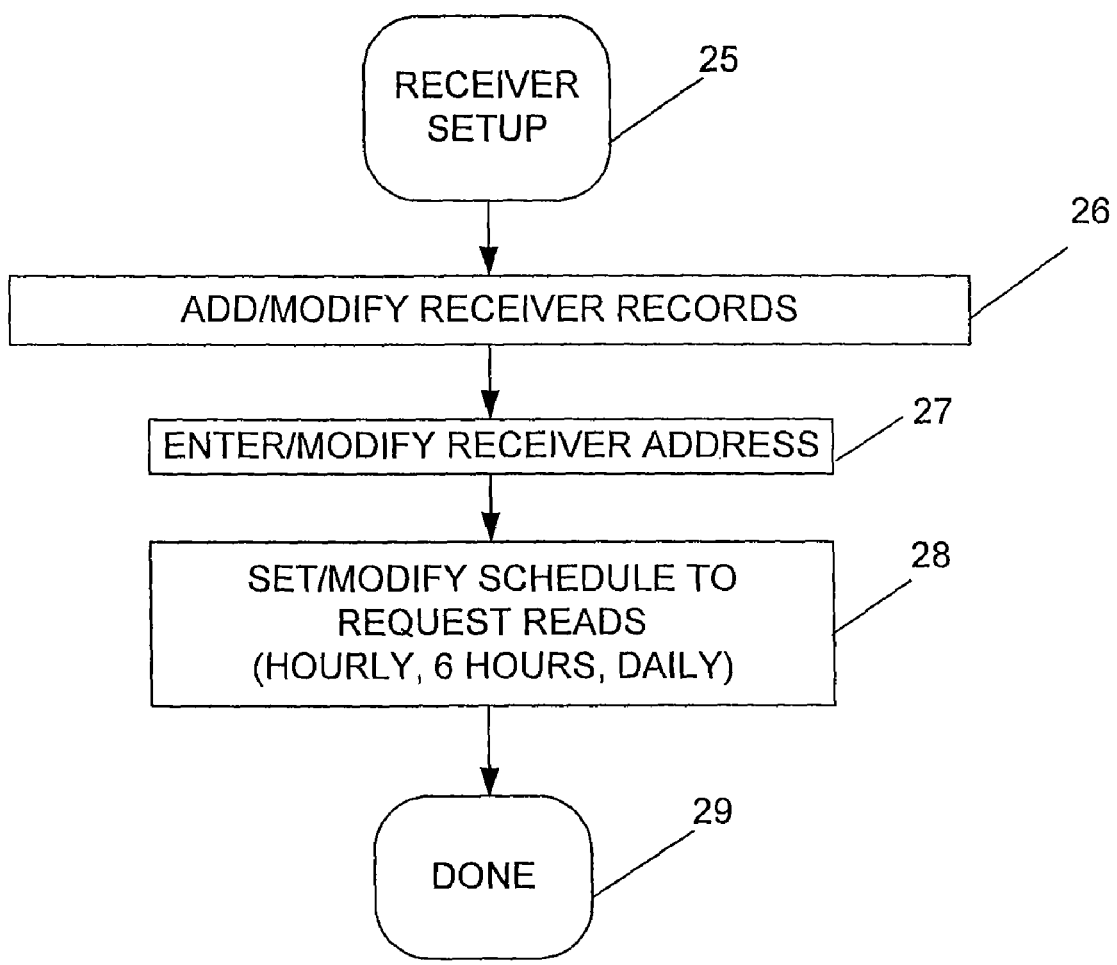
FIG. 2 is a flow chart of a programmed routine for setting up the receivers in the memory of the data collection system.
Figure 3:
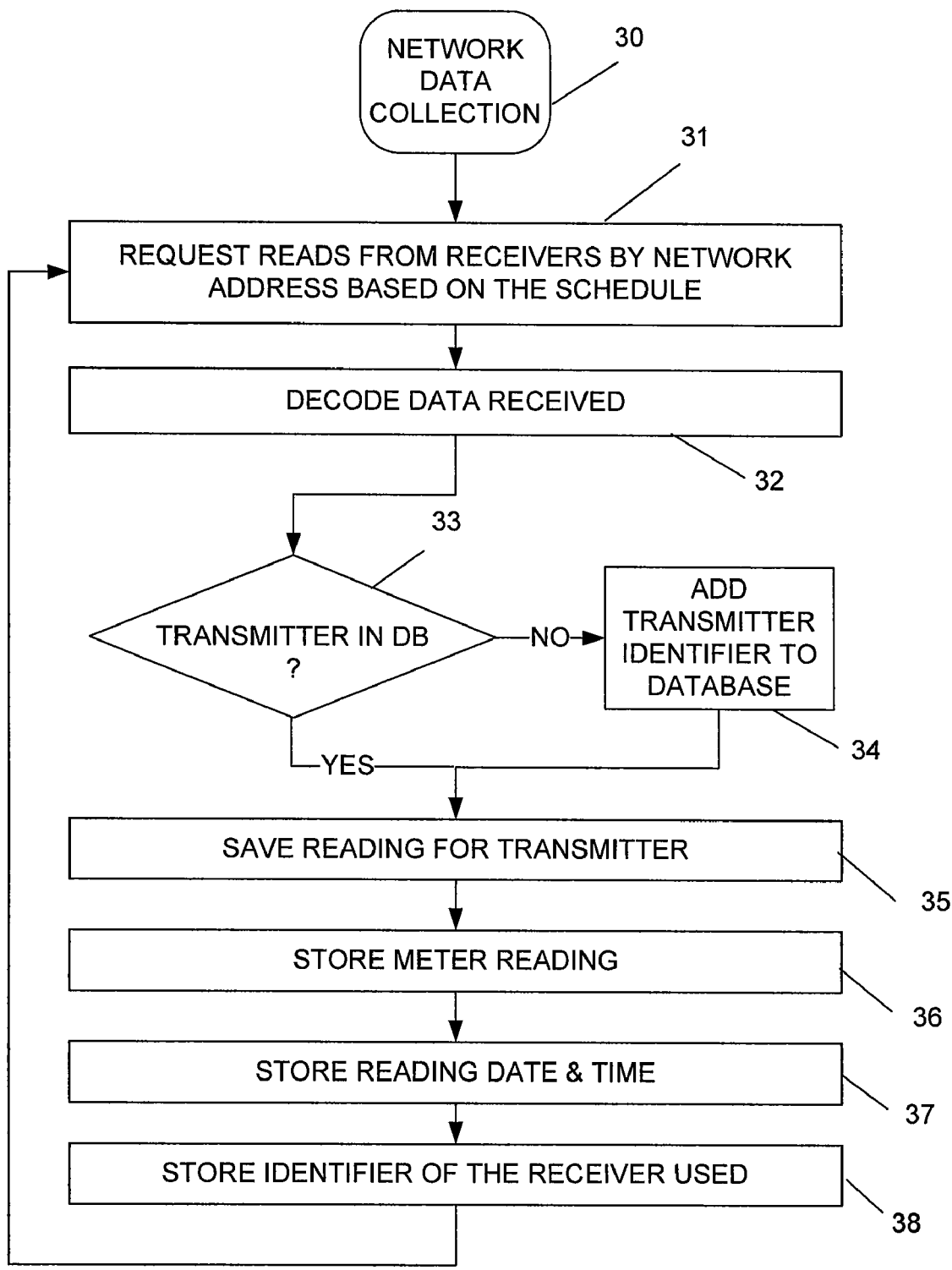
FIG. 3 is a flow chart of a programmed routine for organizing a database of metering data collected from the receivers.
Figure 4:
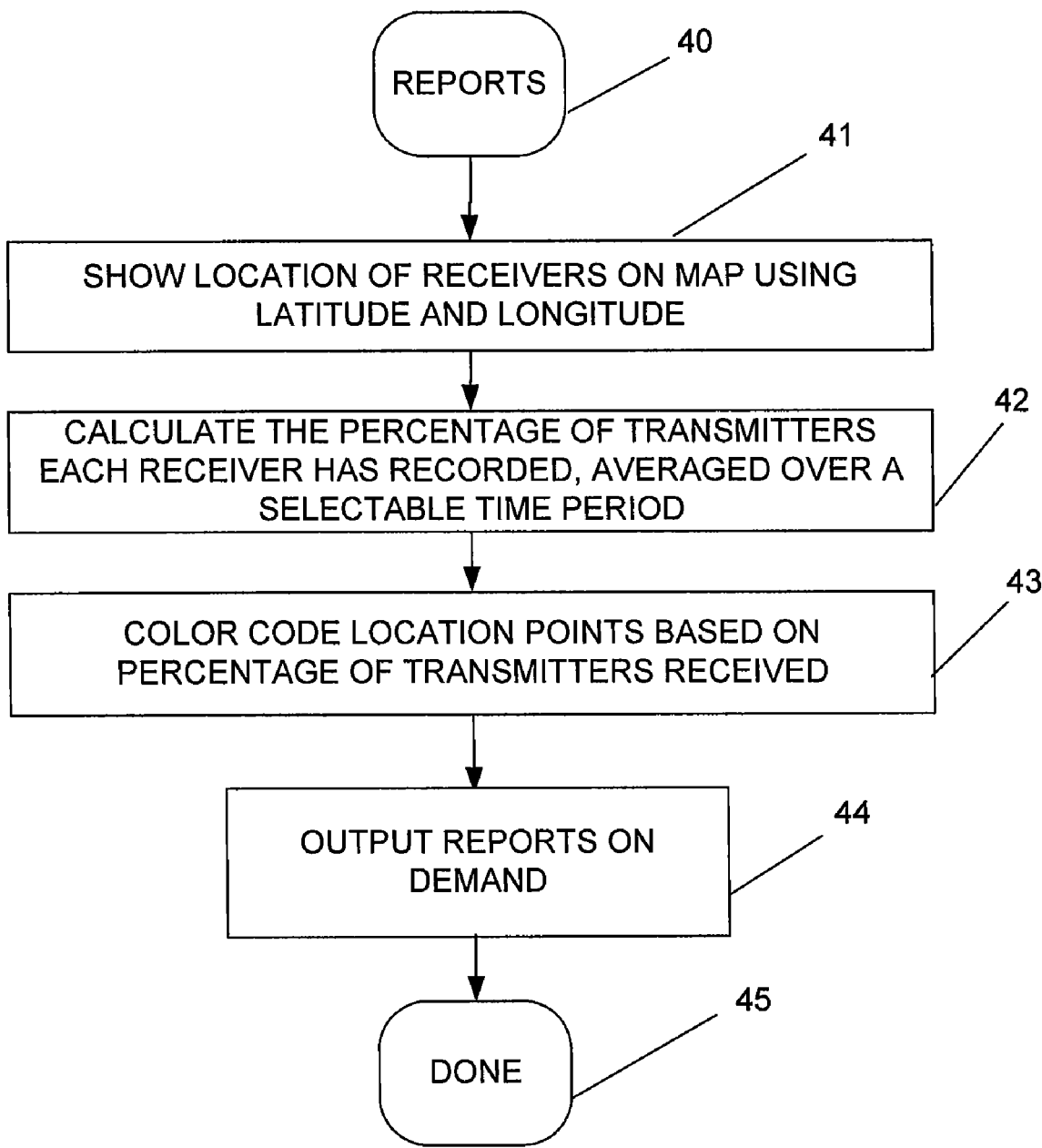
FIG. 4 is a flow chart of a programmed routine for generating reports from the database.

The network data collection computer 10 operates under the control of a stored computer program including a receiver setup routine, as represented by FIG. 2. The blocks in the illustrations in FIGS. 2-4 represent one or more program instructions in the stored computer program that are executed by a processor in the network data collection computer 10. The computer program is stored in the memory in the computer 10, but can also be stored in a tangible data storage medium or in a file for transmission on the Internet.

As seen in FIG. 2, after the starting of the setup routine, as represented by start block 25, a plurality of receiver records are set up, as further represented by process block 26. For each receiver 15, the receiver network address is entered in the record as represented by process block 27. A network address for a receiver can also be modified if necessary. Next, a schedule for communicating with receiver is entered, such as hourly, every six hours or once per day, as represented by process block 28. The receiver setup routine is then done as represented by end block 29.

After the setup of network receivers in FIG. 2, the network data collection computer 10 is ready to begin collecting meter data and setting up the meter reading devices in the database in a routine that is begun as represented by start block 30. As represented by process block 31, the network data collection computer 10 reads in data from the receivers 15 according to the schedule set up in the set up routine in FIG. 2.

A data file 21 (FIGS. 1 and 5a) in the form of an HTML web page is read and, thus, the data must be decoded as represented by process block 32. Next, in FIG. 3, as represented by decision block 33, a check is made to see if the each meter reading device 12, 14 identified in the data file is already listed in the network server database 22. If not, as represented by the "NO" result, a database organizing portion of the routine adds an identifier, such as the serial number of the meter reading device 12, 14, to the database, as represented by process block 34. If the answer is "YES," or if process block 34 has been executed, the database organizing processing portion of the routine stores the meter data and indexes it by receiver, by transmitter and by the date and time of reading, as represented by process blocks 35, 36, 37 and 38. This allows the data to be retrieved in database reports for printing or display by a database reports portion of the computer program.

The database 22 is thus self-populating as to the meter reading devices 12, 14. It requires only a list of addresses for the receivers 15 and a reading interval to begin operation. This saves much labor in installing the network data collection portion of AMR system.

The method of the invention includes reading data from the receivers 15 at scheduled intervals, such as an hour, four times per day or daily, and the file of metering data 21 further includes the read schedule interval for each receiver. Data can be retrieved from the database based on the time it was read from the receiver. This schedule is set at the network data collection computer 10.

Figures 6, 7:
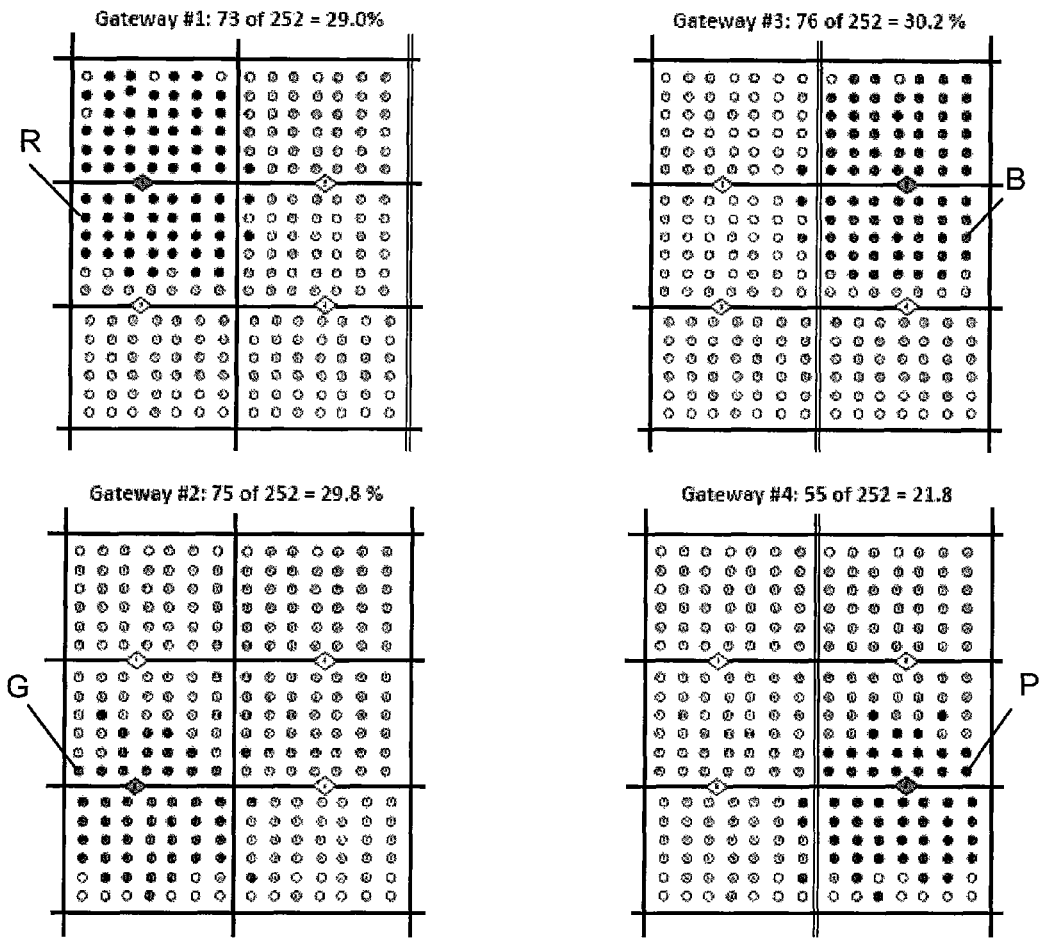
FIG. 6 is a computer display with points on a map color-coded according to the percentage of devices reporting to each receiver.
FIG. 7 is a computer display of a table of the percentage of the meter devices reporting for each receiver over a selectable time period.

The invention also provides reports from the database 22. After entering a reports routine as represented by start block 40 in FIG. 4, the receivers 15 are associated with latitude and longitude data and can be displayed on a map, as represented by process block 41. Next, as represented by process block 42, and as shown in FIG. 7, a calculation can be made by a processor of a percentage of the meter devices 12, 14 reporting for each receiver 15 over a selectable time period, in this case daily. Then, as represented by process block 43, certain location points on a map illustrated in FIG. 6 can be color-coded (R=Red, G=Green, B=Blue and P=Purple) according the percentage of meter data devices 12, 14 from which data was collected for each respective receiver (Gateway #1, Gateway #2, Gateway #3 or Gateway #4). A graphical display (FIG. 6) or table (FIG. 7) can be output upon demand as represented by process block 44. The reports routine is then complete as represented by done block 45.

Figure 5A:
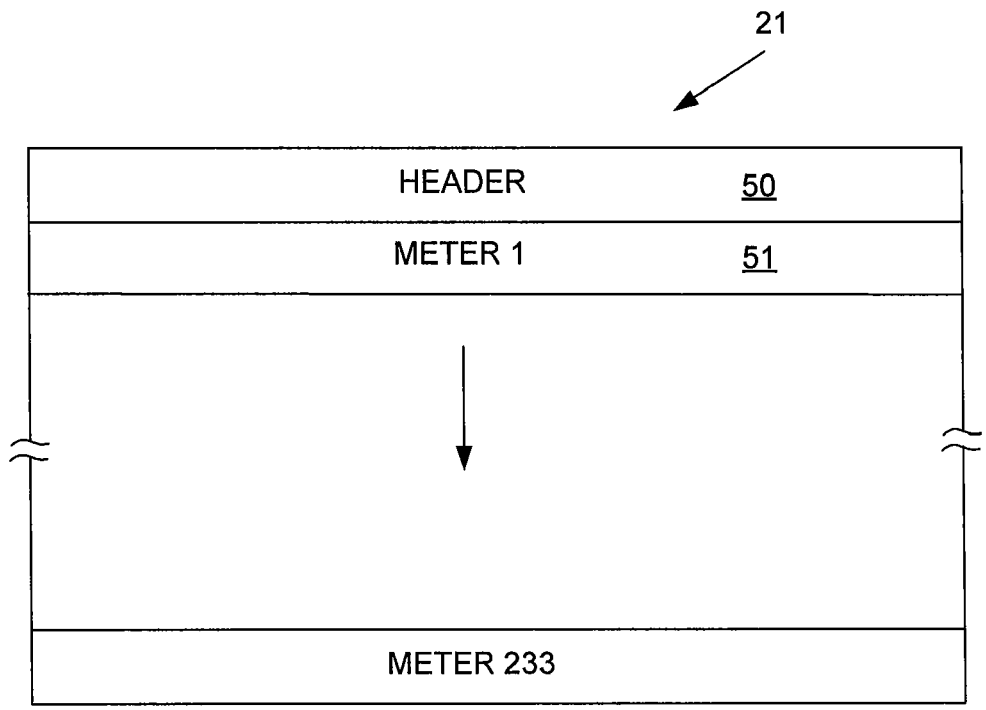
FIG. 5a is a data map of a file of data transmitted between the receivers and the network data collection computer according to the present invention.

FIG. 5a shows a map diagram of a HTML-coded web page 21 of meter data received by the network data collection computer 10 from one of the receivers 15. This would be the format for a system using an Orion® receiver. A system using a Galaxy gateway receiver would use a different file format of a type known in the art. The file in this example has a header 50 and up to 233 lines of data 51 corresponding to 233 meter reading devices in positions from METER 1 to METER 233. The number of meter reading devices can vary from this in other embodiments.

Figure 5B:
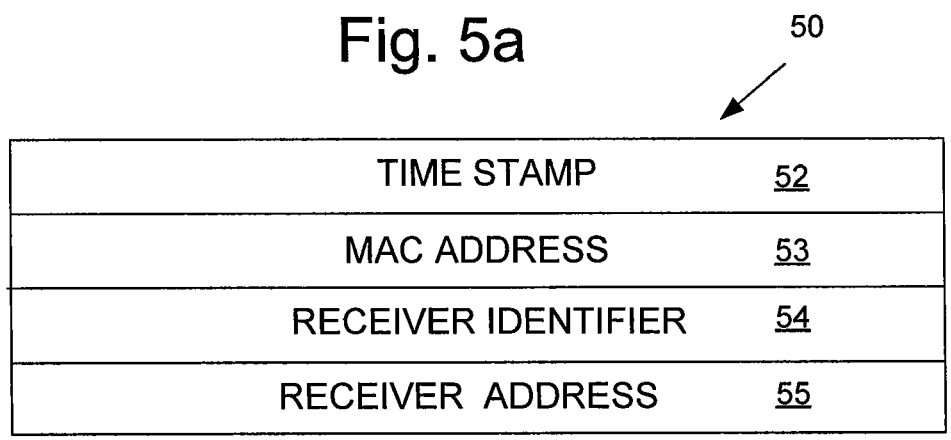

FIG. 5b shows a map of the header 50. There is a first item of data 52 with a time stamp for the entire file of data 21. A second item of data 53 has a MAC (media access control) address for the receiver 15. This is followed by a third item of data 54 containing an identifier such as a serial number for the receiver. This is followed by a fourth item of data 55, which is the network address for the receiver 15.

Figure 5C:
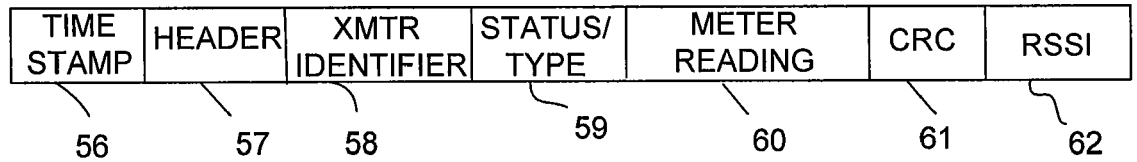

FIG. 5c shows a map of each line of data 51, of which there are up to 233 lines in each file 21. There is a first item of data 56 which is a time stamp for the individual meter reading device 12, 14. Next, there is a header for each meter reading device 12, 14 represented by item 57. This is followed by an item of data 58 representing the identifier, such as a serial number of the transmitter which corresponds to each meter reading device 12, 14. Next, there is a status or type item of data 59 which identifies one of several types of meter reading devices 12, such as an RTR® pulse register/transmitter type, an ADE® digital encoder type, or gas meter registers, or other designations for completely electronic registers. This is followed by the actual meter data or status condition data, as represented by item 60. This is followed by a CRC item of data 61, which is a cyclic redundancy code or error checking code computed from the data earlier in line of data. Finally, a radio signal strength indicator (RSSI) item of data 62 is provided from each meter reading device 12, 14 for radio network diagnostics purposes.

It should now be understood how the data received in the data file 21 is decoded from an HTML-coded web page, and stored in a database 22 that includes a receiver address, a list of meter reading devices 12, 14 served by the receiver 15, a history of readings for the meter reading devices 12, 14 and a history of readings from the receiver 15.

As seen from the above description, the invention provides for easier installation and set up of an AMR system, thereby saving labor and installation cost and providing ease of use to the utility.

This has been a description of the preferred embodiments, but it will be apparent to those of ordinary skill in the art that variations may be made in the details of these specific embodiments without departing from the scope and spirit of the present invention, and that such variations are intended to be encompassed by the following claims.

We claim:

1. A method for collection of meter reading data at a data collection computer through a wide area network from at least one receiver communicating in a local area fixed network with a plurality of meter reading devices, the method comprising:
    addressing at least one receiver through a wide area network at a receiver network address, wherein the receiver communicates with a plurality of meter reading devices located within a geographic area served by a utility;
    receiving a data file through the wide area network from the receiver that includes meter data from a plurality of meter reading devices that have previously communicated with the receiver;
    reading a meter reading device identifier for each of the meter reading devices from the data file and automatically setting up a database including organizing the meter reading device identifier in the database in association with the receiver network address and in association with the meter data for each respective meter reading device;
    storing meter data from each of the meter reading devices in the database for retrieval by at least one of: a receiver address, the meter reading device identifier and a time and date of collection; and
    wherein setting up the database includes setting up a plurality of receiver records such that the data collector addresses each of a plurality of receivers at scheduled times, according to a reading schedule, and wherein the meter data is stored in the database by a time and date of collection.

2. The method of claim 1, wherein the wide area network is the Internet.

3. The method of claim 2, wherein the receiver network address is an Internet Protocol address.

4. The method of claim 2, wherein the receiver network address is a uniform resource locator (URL).

5. The method of claim 1, wherein the meter reading devices include devices for reading condition status data related to a meter or to supply links connected to the meter, and wherein the meter data includes the condition status data.

6. The method of claim 1, wherein the data file received through the wide area network is an HTML-coded web page of data, and wherein the data collector decodes the data file for storage of the meter reading data in the database.

7. The method of claim 1, wherein the data collection computer communicates with a plurality of fixed network receivers through the wide area network, and further comprising calculating a percentage of the meter devices reporting from each respective fixed network receiver over a selected time period and displaying certain location points on a map, wherein the points on the map are color-coded and displayed according to the percentage of meter data devices from which data was collected for each respective fixed network receiver.

8. The method of claim 1, wherein the identifier for each meter reading device is a serial number.

9. A meter data collector for use in collection of utility meter data at a data collection center from at least one receiver for communicating in a local area fixed network with a plurality of meter reading devices, the meter data collector comprising a computer program stored in a tangible, non-transitory medium, for execution by a network meter data collection computer, the meter data collector comprising:
   a network reader portion executable by the network meter data collection computer for addressing at least one receiver through a wide area network at a receiver network address, wherein the receiver communicates with a plurality of meter reading devices located within a geographic area served by a utility;
   the network reader portion receiving a data file through the wide area network from the at least one receiver that includes meter reading data from a plurality of meter reading devices that have previously communicated with the receiver;
   a database organization portion for detecting a meter reading device identifier for each of the meter reading devices from the data file, and executable by the network meter data collection computer for setting up a database including adding each of the meter reading devices to the database by organizing the meter reading device identifier for each meter reading device in the database in association with the receiver network address and the meter data for the respective meter reading device;
   a database reports portion executable by the network meter data collection computer for retrieving meter data for each of the meter reading devices according to each of: a receiver network address, a meter reading device identifier and a time and date of collection; and
   wherein setting up the database includes setting up a plurality of receiver records for a respective plurality of receivers, wherein the network reader portion addresses the receiver at scheduled times, according to a reading schedule, and wherein the meter data is stored in the database by the time and date of collection.

10. The meter data collector of claim 9, wherein the wide area network is the Internet.

11. The meter data collector of claim 9, wherein the receiver network address is an Internet Protocol address.

12. The meter data collector of claim 9, wherein the receiver network address is a uniform resource locator (URL).

13. The meter data collector of claim 9, wherein the meter reading devices include devices for reading condition status data related to a meter or to supply links connected to the meter, and wherein the meter reading data includes the condition status data.

14. The meter data collector of claim 9, wherein the data file received through the wide area network is an HTML-coded web page of data, and wherein the data collector decodes the data file for storage of the meter reading data in the database.

15. The meter data collector of claim 9, wherein the meter data collector communicates with a plurality of fixed network receivers through the wide area network, and further comprising a calculating portion for calculating a percentage of the meter devices reporting from each respective fixed network receiver over a selected time period and a display portion for displaying certain location points on a map, wherein the points on the map are color-coded and displayed according to the percentage of meter data devices from which data was collected for each respective fixed network receiver.

16. The meter data collector of claim 9, wherein the identifier for each meter reading device is a serial number.

* * * * *